US010799972B2

(12) United States Patent
Hoeger et al.

(10) Patent No.: US 10,799,972 B2
(45) Date of Patent: Oct. 13, 2020

(54) SYSTEM FOR CONTROLLING WELDING PARAMETER OF A WELDING SYSTEM

(71) Applicant: Illinois Tool Works Inc., Glenview, IL (US)

(72) Inventors: Michael Vincent Hoeger, Appleton, WI (US); Devan Michael DePauw, Sherwood, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 206 days.

(21) Appl. No.: 14/537,645

(22) Filed: Nov. 10, 2014

(65) Prior Publication Data

US 2016/0129516 A1    May 12, 2016

(51) Int. Cl.
*B23K 9/095* (2006.01)
*B23K 9/10* (2006.01)
*B23K 9/32* (2006.01)

(52) U.S. Cl.
CPC ............ *B23K 9/0953* (2013.01); *B23K 9/095* (2013.01); *B23K 9/1006* (2013.01); *B23K 9/1087* (2013.01); *B23K 9/32* (2013.01)

(58) Field of Classification Search
CPC .... B23K 9/095; B23K 9/0953; B23K 9/1006; B23K 9/1087; B23K 9/32; A63F 13/02; A63F 13/04; A63F 13/06; G06F 3/033; G06F 3/0338
USPC ....... 219/121.11, 125.1, 130.1, 136, 137 PS; 345/161
See application file for complete search history.

(56) References Cited

U.S. PATENT DOCUMENTS

| 3,968,341 A | 7/1976 | Manning |
| 4,051,344 A | 9/1977 | Robbins |
| 6,051,808 A * | 4/2000 | Kleppen ................ B23K 9/282 |
| | | 219/132 |
| 6,956,184 B2 | 10/2005 | Blide |
| 2003/0090065 A1* | 5/2003 | Carter, Jr. ................ A63F 9/30 |
| | | 273/447 |
| 2006/0178778 A1 | 8/2006 | Fuhlbrigge |
| 2011/0062131 A1 | 3/2011 | Binzel |
| 2015/0041447 A1* | 2/2015 | Niedereder .......... B23K 9/0953 |
| | | 219/130.01 |

FOREIGN PATENT DOCUMENTS

| CN | 102821902 | 12/2012 |
| EP | 1702707 | 9/2006 |
| GB | 2216994 | 10/1989 |

(Continued)

OTHER PUBLICATIONS

German to English machine-translation of WO 2013138831.*

(Continued)

*Primary Examiner* — Michael G Hoang
(74) *Attorney, Agent, or Firm* — McAndrews, Held & Malloy, Ltd.

(57) ABSTRACT

Embodiments of a the present disclosure include a remote control system for a welding system having a control device and control circuitry configured to select a first operating parameter adjustment for a first operating parameter of the welding system based on a first actuation of the control device, wherein the first operating parameter adjustment comprises an adjustment to a rate of change of the first operating parameter.

11 Claims, 3 Drawing Sheets

(56) References Cited

FOREIGN PATENT DOCUMENTS

KR 20040009382 1/2004
WO 2013138831 1/2013

OTHER PUBLICATIONS

Wikipedia Definition of Velocity.*
International Search Report from PCT application No. PCT/US2015/053905, dated Apr. 29, 2016, 20 pgs.
Communication EP Appln No. 15781271.0 dated Jul. 29, 2019, 4 pgs.
European Communication for EP15781271 dated Apr. 1, 2020, 4 pages.

* cited by examiner

SYSTEM FOR CONTROLLING WELDING PARAMETER OF A WELDING SYSTEM

BACKGROUND

The present disclosure relates generally to welding systems and, more particularly, to a system and method for controlling welding parameters of a welding system.

Welding is a process that has increasingly become utilized in various industries and applications. Such processes may be automated in certain contexts, although a large number of applications continue to exist for manual welding operations. In both cases, such welding operations rely on a variety of types of equipment to ensure the supply of welding consumables (e.g., wire feed, shielding gas, etc.) is provided to the weld in appropriate amounts at the desired time. Certain welding operations may be performed in locations that are remote from a welding power supply. Accordingly, accessing the welding power supply from the location of the welding operation may not be possible. Furthermore, time and resources may be wasted in moving between the location of the welding operation and the location of the welding power supply.

A variety of remote controls and pendants have been developed that allow for a certain degree of control of weld parameters from remote locations without requiring the operator (or an assistant) to return to the welding power supply. However, these have typically been ergonomically difficult to use, uncomfortable for certain users, and/or not customizable. As such, typical remote controls may provide coarse or unstable control of welding parameter adjustments. There is a need, therefore, for improved techniques allowing for weld parameter adjustment from remote welding locations.

BRIEF DESCRIPTION

In one embodiment, a remote control system for a welding system includes a control device and control circuitry configured to select a first operating parameter adjustment for a first operating parameter of the welding system based on a first actuation of the control device, wherein the first operating parameter adjustment comprises an adjustment to a rate of change of the first operating parameter.

In another embodiment, a system includes a welding torch and a remote control system coupled to the welding torch. The remote control system includes a control device and control circuitry configured to select a first operating parameter adjustment for a first operating parameter of the welding system based on a first actuation of the control device, wherein a relationship between a magnitude of the first actuation of the control device and the first operating parameter adjustment is non-linear.

In a further embodiment, a system includes a remote control system for a welding system having a control device, control circuitry configured to select a first operating parameter adjustment for a first operating parameter of the welding system based on a first actuation of the control device, wherein a relationship between a magnitude of the first actuation of the control device and the first operating parameter adjustment is non-linear, and interface circuitry configured to transmit the first operating parameter adjustment to a component of the welding system.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Present embodiments are directed toward a welding system having a remote control system configured to adjust a welding operating parameter of the welding system. The remote control system may be integrated into the welding torch, such as a handle of the welding torch, or the remote control system may be removably coupled to the welding torch. The remote control system may include a single control device (e.g., a finger tip control device) configured to adjust a single or multiple welding parameters. For example, the welding parameter(s) to be adjusted by the single control device may be selected on a control panel or user interface of a welding power supply. In certain embodiments, the finger tip control device may be configured to enable adjustment of welding parameter by actuating the finger tip control device along one of a plurality of axes. For example, the finger tip control device may be a joystick or a touch pad (e.g., a pressure sensitive touch pad). As will be appreciated, the multi-axis adjustment of the control device may enable customization of multiple welding parameter adjustments, and therefore may accommodate varying preferences of different users.

Additionally, the remote control system may be configured to enable non-linear adjustment of a welding parameter. That is, actuation of the control device of the remote control system may adjust the rate of change of the welding operating parameter. For example, when the control device is actuated in a first direction at a first magnitude, the welding parameter may change at a first rate, and when the control device is actuated in the first direction at a second magnitude, the welding parameter may change at a second rate (e.g., greater than the first rate). In this manner, the welding parameter may be adjusted or varied between minimum and maximum values with a single finger motion. Additionally, the non-linear adjustment of welding parameters may reduce the accidental or unintended adjustment of a welding parameter during a welding operation.

Furthermore, for embodiments of the remote control system with a multi-axis control device (e.g., a joystick), the remote control system may be configured to use a greatest unit vector input as the input control signal. For example, in certain embodiments, the multi-axis control device may be configured to adjust a first parameter when the control device is actuated along a first axis (e.g., X-axis) and adjust a second parameter when the control device is actuated along a second axis (Y-axis). If the control device is actuated (e.g., inadvertently) along two axes (e.g., both X and Y axes) during a welding control adjustment, the remote control system may be configured to adjust the welding parameter based on the greatest unit vector input of the actuation. As a result, a user may adjust a parameter using a single control with a reduced risk of unintentional adjustment of other parameters.

Figure 1:
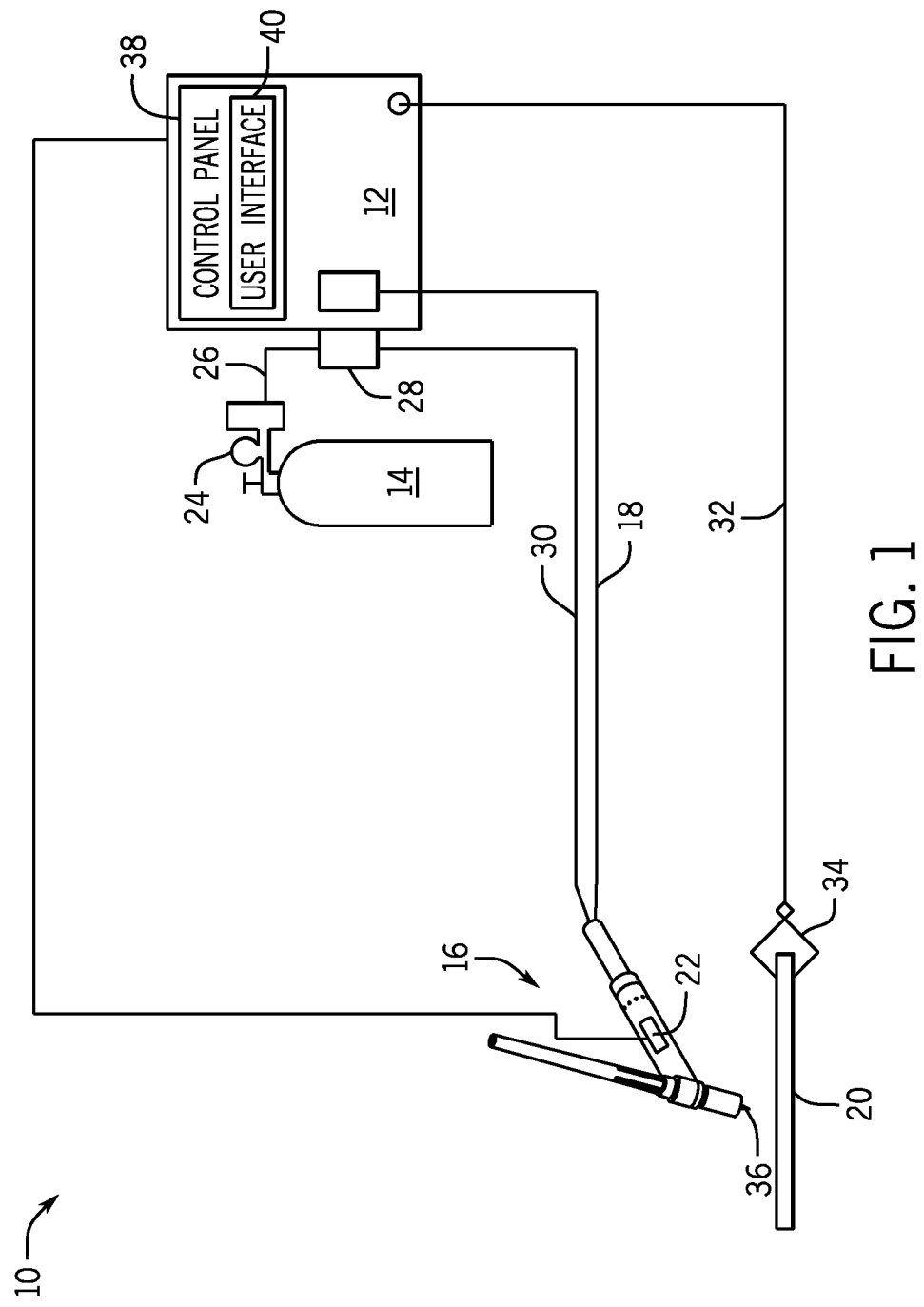
FIG. 1 is a schematic view of an exemplary welding system, in accordance with an embodiment of the present disclosure.

Turning now to the figures, FIG. 1 illustrates a welding system 10 (e.g., a tungsten inert gas (TIG) welding system) including a power source 12, a shielding gas source 14, and a torch 16. In the illustrated embodiment, the power source 12 provides power to the welding torch 16 via a power supply conduit 18. The power source 12 may supply a direct current (DC) or alternating current (AC) to the torch 16 depending on the desired application. For example, an AC current may be suited for welding aluminum or magnesium, and a DC current may be suited for welding stainless steels, nickel or titanium. In addition to matching the current to the material selection, the output of the power source 12 may be varied to obtain desired weld characteristics. For example, a low AC frequency (e.g., 56 Hz) current may generate a wide arc with shallow penetration of a work piece 20, while a high AC frequency (e.g., 200 Hz) current may generate a focused arc with deeper penetration into the work piece 20.

In addition to the frequency of the current, the power source 12 may vary the amperage of the current output to the torch 16. The setting for the amperage output by the power source 12 may be adjusted by a setting a knob or button or other input device on the power source 12, or may be set by a remote control system 22. The remote control system 22 may also be configured to adjust other operating parameters of the welding system 10. As described in detail below, present embodiments of the remote control system 22 further include features configured to enable improved adjustment of the one or more operating parameters of the welding system 10.

The torch 16 may be supplied with a shielding gas from a gas source 14. In general, the shielding gas may be supplied to the torch 16 and expelled from the torch at the location of the weld. The shielding gas may be expelled immediately prior to striking the welding arc, throughout welding, and/or until shortly after the welding arc is extinguished. The shielding gas protects the welding area from atmospheric gases such as nitrogen and oxygen, which can cause fusion defects, porosity, and weld metal embrittlement. The shielding gas may also transfer heat from the welding electrode to the metal and may help to start and maintain a stable arc.

As depicted in FIG. 1, the shielding gas may be provided in a container and delivered to the torch 16 via a regulator 24, a conduit 26, a gas valve 28, and a gas conduit 30. The regulator 24 may allow an operator to limit the pressure of the gas delivered to the gas valve 28 to obtain a desired flow rate. Further, the gas valve 28 may provide for stopping and starting the flow of the shielding gas to the torch 16 in coordination with other welding operations. Although shown mounted on the power source 12, the gas valve 28 may be located at other positions within the welding system 10, e.g., on the torch 16.

In general, the welding system 10 may provide for current flow via a work piece 20 to the power source 12. For example, as depicted in FIG. 1, the welding system 10 may include a cable 32 that is secured to the work piece 20 via a work clamp 34. In this configuration, the current provided by the power source 12 flows through the supply conduit 18 to the torch 16, flows across an arc from an electrode 36 to the work piece 20, and returns to the power source 12 via the work clamp 34 and the cable 32.

As mentioned above, present embodiments of the torch 16 include the remote control system 22, which includes features configured to enable improved adjustment of one or more operating parameters of the welding system 10. As shown, the remote control system 22 is coupled to the torch 16. In certain embodiments, the remote control system 22 may be integrated with the torch 16. However, in other embodiments, the remote control system 22 is removably coupled to the torch 16 or the remote control system 22 may be a stand-alone component of the welding system 10. As discussed in detail below, the remote control system 22 may include a control device, such as a joystick, pressure sensitive touch pad, rocker switch, etc., configured to enable adjustment of one or more operating parameters of the welding system 10. The remote control system 22 may also include other features that enable improved adjustment of the one or more operating parameters. For example, the remote control system 22 may be configured to enable non-linear adjustment of the one or more operating parameters, the control device of the remote control system 22 may include a multi-axis control device, among other features.

As mentioned above, the remote control system 22 includes a control device (e.g., a single control device) configured to enable adjustment of one or more operating parameters of the welding system 10. For example, the remote control system 22 may be configured to adjust a welding current voltage, amperage, frequency, or other operating parameters of the welding system 10 or power supply 12. In certain embodiments, a user may configure or select the operating parameters to be controlled by the remote control system 22 with the welding power supply 12, which is coupled to the remote control system 22. To this end, in the illustrated embodiment, the welding power supply 12 includes a control panel 38 with a user interface 40. The control panel 38 may include control/interface circuitry having volatile or non-volatile memory, such as ROM, RAM, magnetic storage memory, optical storage memory, or a combination thereof. A variety of operating parameters may be stored in the memory along with code configured to provide a specific output (e.g., initiate wire feed, enable gas flow, etc.) during operation. The user may input or select the welding operating parameters to be controlled by the remote control system 22 with the user interface 40, and the welding power supply 12 may communicate the selections to the remote control system 22. During a welding operation, a user may adjust the one or more welding operating parameters with the remote control system 22, and the remote control system 22 may communicate commands to the control panel 38, which subsequently outputs commands to the welding power supply 12 or other component of the welding system 10. In certain embodiments, the user interface 40 may also be used to customize various features or attributes of the remote control system 22, as discussed below.

Figure 2:
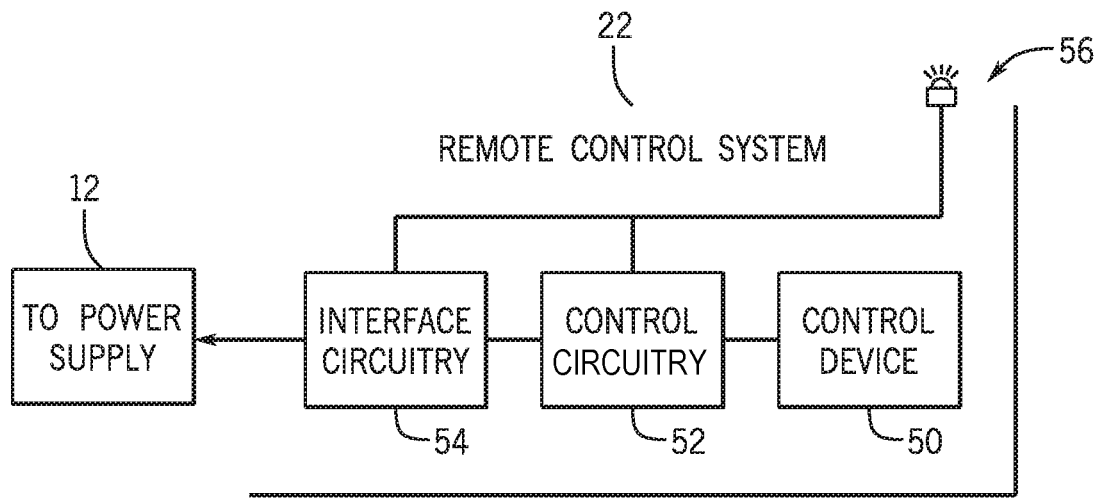
FIG. 2 is a schematic view of a welding remote control system, in accordance with an embodiment of the present disclosure.

FIG. 2 is a schematic of an embodiment of the remote control system 22 of FIG. 1. As mentioned above, the remote control system 22 is configured to control one or more operating parameters of the welding system 10. In the illustrated embodiment, the remote control system 22 includes a control device 50, control circuitry 52, and interface circuitry 54.

As mentioned above, the control device 50 is configured to adjust a single or multiple welding parameters. As described below, the control device 50 may be a fingertip control device and may be configured to be actuated along a plurality of axes. For example, the control device 50 may be a joystick, a rocker switch, a touch pad (e.g., a pressure sensitive touch pad), or other suitable fingertip control device. In embodiments where the control device 50 is a multi-axis control device (e.g., a joystick), the control device 50 may be configured to adjust multiple operating parameters of the welding system 10. For example, the control device 50 may be actuated along a first axis to control a first operating parameter, and the control device 50 may be actuated along a second axis to control a second operating parameter. As mentioned above, in certain embodiments, the particular operating parameters to be adjusted by actuation of the different axes of the control device 50 may be selected using the user interface 40 of the welding power supply 12 or using another user interface of the welding system 10 (e.g., a separate user interface).

Upon actuation of the control device 50, the control device 50 may communicate the particular actuation (e.g., movement) to the control circuitry 52 of the remote control system 22. In the illustrated embodiment, the control circuitry 52 is shown as an integrated component of the remote controls system 22. However, in other embodiments, the control circuitry 52 may be integrated with the welding power supply 12 or integrated with another component of the welding system 10. The control circuitry 52 may include volatile or non-volatile memory, such as ROM, RAM, magnetic storage memory, optical storage memory, or a combination thereof. A variety of operating parameter commands or adjustments may be stored in the memory along with code configured to select an operating parameter command or adjustment based on the particular actuation of the control device 50.

As discussed above, the remote control system 22 may be configured to enable non-linear adjustment of a welding operating parameter. The control circuitry 52 may be configured to select a rate of change of the welding operating parameter based on the actuation of the control device 50. For example, if the control device 50 is actuated in a first direction at a first magnitude, the control circuitry 52 may select a command to change the welding operating parameter at a first rate. When the control device 50 is actuated in the first direction at a second magnitude greater than the first magnitude, the control circuitry 52 may select a command to change the welding operating parameter at a second rate (e.g., greater than the first rate). In this manner, the welding operating parameter may be adjusted or varied between minimum and maximum values with a single finger motion. Additionally, the non-linear adjustment of welding parameters may reduce the accidental or unintended adjustment of a welding parameter during a welding operation.

The control circuitry 52 may also use a greatest unit vector input of the input signal of the control device 50 to select a command to change the welding operating parameter. For example, in certain embodiments, the multi-axis control device 50 may be configured to adjust a first parameter when the control device 50 is actuated along a first axis (e.g., X-axis) and adjust a second parameter when the control device 50 is actuated along a second axis (Y-axis). If the control device 50 is actuated (e.g., inadvertently) along two axes (e.g., both X and Y axes or diagonally) during a welding control adjustment, the control circuitry 52 may be configured to adjust the welding operating parameter based on the greatest unit vector input of the actuation of the control device 50. As a result, a user may adjust a welding operating parameter using a single, multi-axis control device 50 with a reduced risk of unintentional adjustment of other parameters.

The control circuitry 52 communicates the selected commands to the interface circuitry 54 of the remote control system 22. The interface circuitry 54 may then communicate the command to the appropriate component of the welding system 10, such as the welding power supply 12. In certain embodiments, the interface circuitry 54 is configured to transmit the commands via a wired connection, while in other embodiments the interface circuitry 54 may communicate the commands via a wireless connection.

The remote control system 22 may also have other features, such as a indicator device 56. In the illustrated embodiment, the indicator device 56 is a visual indicator device, such as a light emitting diode or other illuminating component. The indicator device 56 is configured to provide feedback to a user or operator under certain conditions, which may be customizable. For example, in the illustrated embodiment, the indicator device 56 may illuminate when a maximum or minimum value of a welding operating parameter is reached during adjustment of the welding operating parameter via the control device 50. The indicator device 56 may also communicate other conditions, such as signal strength between the interface circuitry 54 and the welding power supply 12. For example, the indicator device 56 may illuminate a green color when the interface circuitry 54 and the welding power supply 12 are communicating via a strong signal, a yellow or amber color when the interface circuitry 54 and the welding power supply 12 are communicating via a weak signal, or a flashing yellow or amber when the interface circuitry 54 and the welding power supply 12 are not communicating due to signal loss. As will be appreciated, the remote control system 22 may include other and/or additional feedback devices 22, such as an auditory feedback device.

Figure 3:
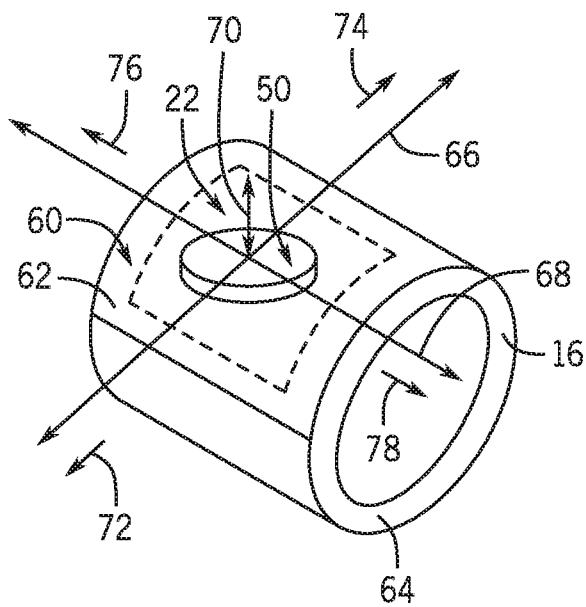
FIG. 3 is a partial perspective view of a welding torch having a control device of the welding remote control system, in accordance with an embodiment of the present disclosure.
Figure 4:
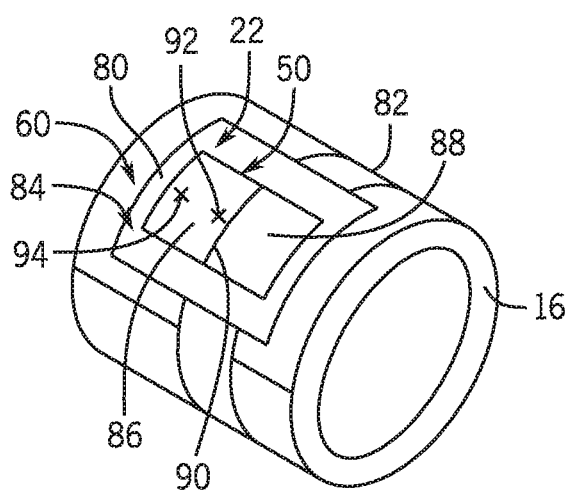
FIG. 4 is a partial perspective view of a welding torch having a control device of the welding remote control system, in accordance with an embodiment of the present disclosure.

FIGS. 3 and 4 are perspective views of embodiments of the remote control system 22. In particular, FIG. 3 shows an embodiment of the remote control system 22 integrated with the welding torch 16 of the welding system 10, and FIG. 4 shows an embodiment of the remote control system 22 removably coupled to the welding torch 16. However, as mentioned above, in other embodiments the remote control system 22 may be a stand-alone component of the welding system 10. For example, the remote control system 22 may be a pad or puck that includes the control device 50.

In the embodiment shown in FIG. 3, the control device 50 is a multi-axis control device, such as a joystick, that is integrated with a handle 60 of the welding torch 16. In certain embodiments, the multi-axis control device 50 may be a low profile control device that is slightly elevated above an outer surface 62 of the handle 60 of the welding torch 16. The other components of the remote control device 22, such as the control circuitry 52 and the interface circuitry 54 are disposed within a body 64 of the handle 60 of the welding torch 16. In certain embodiments, the handle 60 of the welding torch 16 may be suitable for use with multiple welding torches 16. In other words, the handle 60 may be interchangeable with multiple welding torch 16 bodies, thereby enabling use of one handle 60 having the remote control system 22 with welding torches 16 of various amperage ratings.

As mentioned above, the control device 50 shown in FIG. 3 is a multi-axis control device, such as a joystick. As such, the control device 50 has multiple degrees of movement. Specifically, the control device 50 may be actuated along a first axis 66 (e.g., an X-axis), a second axis 68 (e.g., a Y-axis), and a third axis 70 (e.g., a Z-axis). Actuation of the control device 50 in along each axis 66, 68, and 70 may adjust or control a different function and/or welding operating parameter of the welding system 10. For example, actuation of the control device 50 along the first axis 66 may adjust a first welding operating parameter. Specifically, actuation of the control device 50 in a first direction 72 (e.g., a left direction) may decrease (or increase) the first welding operating parameter value, and actuation of the control device 50 in a second direction 74 (e.g., a left direction) may increase (or decrease) the first welding operating parameter value. Similarly, actuation of the control device 50 along the second axis 68 may adjust a second welding operating parameter. Specifically, actuation of the control device 50 in a third direction 76 (e.g., a forward direction) may increase (or decrease) the second welding operating parameter value, and actuation of the control device 50 in a fourth direction 78 (e.g., a rearward direction) may decrease (or increase) the second welding operating parameter value. In certain embodiments, the control device 50 may be actuated along the first axis 66 and the second axis 68 simultaneously to adjust the first welding operating parameter value and the second welding operating parameter value simultaneously.

Additionally, a rate of change of the value of the welding operating parameter may depend on the magnitude of the actuation of the control device 50. Specifically, if the control device 50 is actuated along the first axis 66 in the first direction 72 at a first magnitude, the remote control system 22 may change (e.g., increase or decrease) the value of the welding operating parameter at a first rate of change. If the control device 50 is actuated along the first axis 66 in the first direction 72 at a second magnitude greater than the first magnitude, the remote control system 22 may change (e.g., increase or decrease) the value of the welding operating parameter at a second rate of change greater than the first rate of change. As a result, a user may adjust a welding operating parameter using the control device 50 with a reduced risk of unintentional adjustment of the welding operating parameter. For example, accidental bumps or a shaky finger/thumb of the user may not effectuate large or significant adjustments in the welding operating parameter.

As discussed above, the first and second welding operating parameters to be controlled by actuation of the control device 50 along the first and second axes 66 and 68, respectively, may be customized, e.g., via selection with the user interface 40 of the welding power supply 12. Furthermore, actuation of the control device 50 along the third axis 70 may toggle a welding component (e.g., the welding power supply 12 or the welding torch 16) on and off. In other words, pressing the control device 50 downward may activate and deactivate operation of the welding power supply 12 or the welding torch 16.

As mentioned above, FIG. 4 illustrates an embodiment of the remote control system 22 removably coupled to the welding torch 16. Specifically, the remote control system 22 is a modular unit 80 that is coupled to the handle 60 of the welding torch 16 via a strap 82, buckle, belt, or other fastening device. As a result, the remote control system 22 may be readily removed from one welding torch 16 and secured to another welding torch 16. The control circuitry 52 and the interface circuitry 54 may be disposed within the modular unit 80, while the control device 50 may be exposed to an exterior 84 of the modular unit 80. In embodiments where the remote control system 22 is a stand-alone component of the welding system 10, the remote control system 22 may be similar to the embodiment shown in FIG. 4, except the modular unit 80 may not be coupled to the welding torch 16.

In the illustrated embodiment, the control device 50 is a touch pad or pressure sensitive pad. As such, a user may touch and/or press the control device 50 to effectuate an adjustment in one or more welding operating parameters. In an embodiment where the control device 50 is a pressure sensitive pad, an operating parameter adjustment command of the remote control system 22 may be based on a pressure applied to one or more regions of the control device 50. For example, the control device 50 shown in FIG. 4 has a first region 86 and a second region 88 separated by a center line 90 (e.g., an origin). When a user applies a pressure to the first region 86, the remote control system 22 may communicate a command to increase (or decrease) a value of a welding operating parameter, and when a user applies a pressure to the second region 88, the remote control system 22 may communicate a command to decrease (or increase) a value of the welding operating parameter. Additionally, a rate of change of the value of the welding operating parameter may depend on the amount of pressure applied to the first region 86 or the second region 88. In other words, if a first pressure is applied to the first region 86, the remote control system 22 may change (e.g., increase or decrease) the value of the welding operating parameter at a first rate of change. If a second pressure greater than the first pressure is applied to the first region 86, the remote control system 22 may change (e.g., increase or decrease) the value of the welding operating parameter at a second rate of change greater than the first rate of change.

In an embodiment where the control device 50 is a touch pad, the rate of change of the welding operating parameter may be based on a touched or pressed location within the first or second region 86 or 88 of the control device 50. For example, in the illustrated embodiment, if the user touches or presses the control device 50 at a first location 92 of the first region 86, the remote control system 22 may adjust (e.g., increase or decrease) the welding operating parameter at a first rate of change. If the user touches or presses the control device 50 at a second location 94 of the first region 86, which is farther from the center line 90 (e.g., the origin) of the control device 50 than the first location 92, then the remote control system 22 may adjust (e.g., increase or decrease) the welding operating parameter at a second rate of change greater than the first rate of change.

Figure 5:
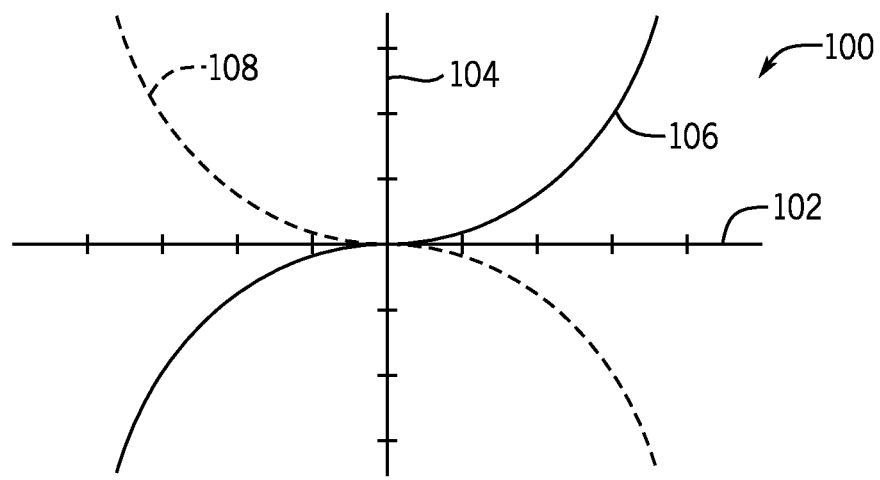
FIG. 5 is a graph illustrating adjustment of a welding parameter using a welding remote control system, in accordance with an embodiment of the present disclosure.

As discussed above, the remote control system 22 may be configured to enable non-linear adjustment of a welding operating parameter. More specifically, the control circuitry 52 may be configured to select a rate of change of the welding operating parameter based on the actuation of the control device 50. FIG. 5 is a graph 100 illustrating a rate of change of a welding operating parameter as a function of a magnitude of the actuation of the control device 50. In other words, an X-axis 102 of the graph 100 represents a magnitude of the actuation of the control device 50, while a Y-axis 104 of the graph 104 represents a rate of change of the welding parameter.

As shown in the graph 100, the relationship between the magnitude of the action of the control device 50 and the rate of change of a welding operating parameter is non-linear. For example, as represented by line 106, the rate of change of the welding operating parameter increases at a faster rate than the increase in magnitude of control device 50 actuation. Similarly, the rate of change of the welding operating parameter decreases at a faster rate than the decrease in magnitude of control device 50 actuation.

As will be appreciated, line 106 may represent function of the control device 50 where the control device 50 has a standard style control. In other words, an increase in magnitude (e.g., movement a joystick in a forward direction) results in an increase in the rate of change of the welding operating parameter. Additionally, a decrease in magnitude (e.g., movement a joystick in a rearward direction) results in a decrease in the rate of change of the welding operating parameter. However, in other embodiments (e.g., based on user preference or customization), the control device 50 may have an inverted or "airplane" style configuration. For example, as represented by line 108, the control device 50 may be actuated to increase in magnitude (e.g., movement a joystick in a forward direction) to effectuate a decrease in the rate of change of the welding operating parameter, while the control device 50 may be actuated to decrease in magnitude (e.g., movement a joystick in a rearward direction) to effectuate an increase in the rate of change of the welding operating parameter.

Figure 6:
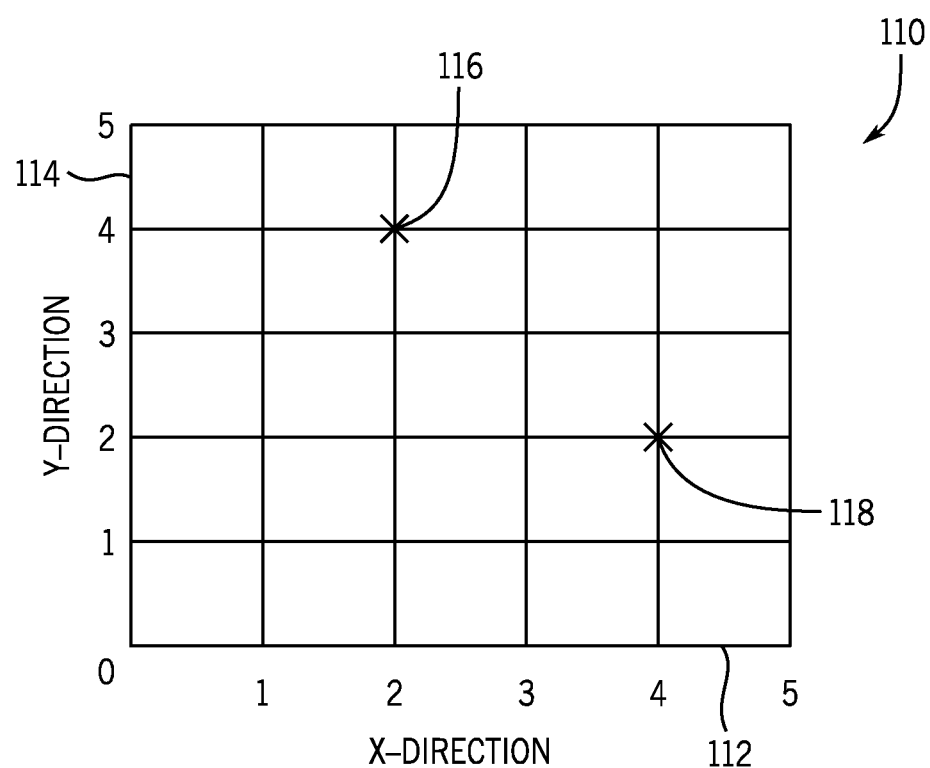
FIG. 6 is a grid illustrating adjustment of a welding parameter using a welding remote control system, in accordance with an embodiment of the present disclosure.

FIG. 6 is a grid 110 illustrating actuation of the control device 50 of the remote control system 22, where the control device 50 is a multi-axis control device (e.g., a joystick). Specifically, the grid 110 includes X coordinates along an X-axis 112 and Y coordinates along a Y-axis 114. Actuation of the control device 50 along the X-axis 112 may effectuate adjustment of a first welding operating parameter, and actuation of the control device 50 along the Y-axis 114 may effectuate adjustment of a second welding operating parameter.

As will be appreciated, in embodiments where the control device 50 is a multi-axis control device, such as a joystick, the control device 50 may be configured to move along multiple axes at once (e.g., along both the X-axis 112 and the Y-axis 114). To prevent multiple welding operating parameters from being unintentionally adjusted at the same time, the remote control system 22 (e.g., the control circuitry 52) may be configured to use a greatest unit vector input as the input control signal for a welding operating parameter adjustment. For example, as indicated by point 116, the control device 50 may be adjusted along the X-axis 112 and the Y-axis 114. In particular, the control device 50 is adjusted two units of magnitude along the X-axis 112 and four units of magnitude along the Y-axis 114. This adjustment or actuation of the control device 50 may be communicated to the control circuitry 52. The control circuitry 52 may then determine a greatest unit vector of the actuation of the control device 50. Specifically, for actuation of the control device 50 at point 116, the greatest unit vector is the actuation of four units of magnitude along the Y-axis 114. Accordingly, the control circuitry 52 may ignore the actuation of the control device 50 along the X-axis 112, and the control circuitry 52 may determine an appropriate welding operating parameter adjustment based on the actuation of the control device 50 along the Y-axis 114.

Similarly, for an actuation of the control device 50 represented by point 118 on the grid 110, the control device 50 is adjusted four units of magnitude along the X-axis 112 and two units of magnitude along the Y-axis 114. In such a circumstance, the greatest unit vector is the actuation of four units of magnitude along the X-axis 112. Accordingly, the control circuitry 52 may ignore the actuation of the control device 50 along the Y-axis 114, and the control circuitry 52 may determine an appropriate welding operating parameter adjustment based on the actuation of the control device 50 along the X-axis 112. As will be appreciated, the determination and use of a greatest unit vector of the control device 50 actuation to select an appropriate welding operating parameter adjustment command may reduce the risk of unintentional adjustment of other parameters in embodiments where the control device 50 is a multi-axis control device.

As discussed in detail above, present embodiments are directed toward the welding system 10 having the remote control system 22 configured to adjust a welding operating parameter of the welding system 10. The remote control system 22 may be integrated into the welding torch 16, such as the handle 60 of the welding torch 16, or the remote control system 22 may be removably coupled to the welding torch 16. The remote control system 22 includes the control device 50 (e.g., a finger tip control device) configured to adjust a single or multiple welding operating parameters. For example, the welding parameter(s) to be adjusted by the single control device 50 may be selected on the control panel 32 or user interface 40 of the welding power supply 12. In certain embodiments, the finger tip control device 50 may be configured to enable adjustment of welding parameter by actuating the finger tip control device 50 along one or more of a plurality of axes. For example, the finger tip control device 50 may be a joystick or a touch pad (e.g., a pressure sensitive touch pad). As will be appreciated, the multi-axis adjustment of the control device 50 may enable customization of multiple welding parameter adjustments, and therefore may accommodate varying preferences of different users. Additionally, other characteristics of the control device 50 may be adjusted, such as sensitivity, resistance, and so forth. Furthermore, as discussed in detail above, the actuation of the control device 50 may effectuate a non-linear adjustment of welding operating parameters. That is, a rate of change of the welding operating parameter may be adjusted based on a magnitude of the actuation of the control device 50. Furthermore, in certain embodiments, such as an embodiment having a multi-axis control device 50, a greatest unit vector input of the control device 50 actuation may be utilized to determine an appropriate or desires welding operating parameter adjustment.

While only certain features of the disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A remote control system for a welding system, comprising:
    a control device disposed on an outer surface of a handle a welding torch, wherein:
        the control device comprises a multi-axis control device, wherein the multi-axis control device comprises a joystick, and
        the control device is configured to adjust multiple operating parameters of the welding system based on movement or position of input relative to multiple axes of the multi-axis control device; and
    control circuitry configured to:
        identify a first discrete input actuation of the control device, the first discrete input actuation comprising a first magnitude;
        identifying a first operating parameter of the welding system based on at least one of position and direction of the first discrete input actuation relative to at least one axis of the multiple axes;
        determine a rate of change of the first operating parameter of the welding system based on the first magnitude; and adjust the first operating parameter by a first operating parameter adjustment based on the rate of change of the first operating parameter.

2. The remote control system for the welding system of claim 1, wherein the control circuitry is configured to:
identify a second discrete input actuation of the control device, the second discrete input actuation comprising a second magnitude;
determine a second rate of change of a second operating parameter of the welding system based on the second magnitude; and
adjust the second operating parameter by a second operating parameter adjustment based on the second rate of change of the second operating parameter.

3. The remote control system for the welding system of claim 2, wherein the first discrete input actuation comprises actuation of the control device along a first axis, the first magnitude corresponds to a magnitude of actuation along the first axis, the second discrete input actuation comprises actuation of the control device along a second axis, the second magnitude corresponds to a magnitude of actuation along the second axis, and the first and second axes are perpendicular to one another.

4. The remote control system for the welding system of claim 2, wherein the control circuitry is configured to simultaneously adjust the first operating parameter by the first operating parameter adjustment and adjust the second operating parameter by the second operating parameter adjustment for the second operating parameter of the welding system.

5. The remote control system for the welding system of claim 1, wherein the control circuitry is configured to determine the first operating parameter adjustment based on a greatest unit vector of the first discrete input actuation.

6. The remote control system for the welding system of claim 1, wherein a relationship between the first discrete input actuation and the first operating parameter adjustment is non-linear.

7. A system, comprising:
a welding torch comprising a handle; and
a remote control system at least partially disposed on an outer surface of the handle of the welding torch, the remote control system comprising:
a control device, wherein:
the control device comprises a multi-axis control device, wherein the multi-axis control device comprises a joystick, and
the control device is configured to adjust multiple operating parameters of the welding system based on movement or position of input relative to multiple axes of the multi-axis control device; and
control circuitry configured to:
identify a first discrete input actuation of the control device, the first discrete input actuation comprising a first magnitude;
identifying a first operating parameter of the welding system based on at least one of position and direction of the first discrete input actuation relative to at least one axis of the multiple axes;
determine a rate of change of the first operating parameter of the welding system based on the first magnitude; and
adjust the first operating parameter by a first operating parameter adjustment based on the rate of change of the first operating parameter;
wherein a relationship between an input magnitude of the first discrete input actuation of the control device and the first operating parameter adjustment is non-linear.

8. The system of claim 7, wherein the remote control system comprises a feedback indicator configured to providing an indication of an attained value of the first operating parameter.

9. A system, comprising:
a remote control system for a welding system, comprising:
a control device disposed on an outer surface of a handle of a welding torch, wherein:
the control device comprises a multi-axis control device, wherein the multi-axis control device comprises a joystick, and
the control device is configured to adjust multiple operating parameters of the welding system based on movement or position of input relative to multiple axes of the multi-axis control device;
control circuitry configured to:
identify a first discrete input actuation of the control device, the first discrete input actuation comprising a first magnitude;
identifying a first operating parameter of the welding system based on at least one of position and direction of the first discrete input actuation relative to at least one axis of the multiple axes;
determine a rate of change of the first operating parameter of the welding system based on the first magnitude; and
adjust the first operating parameter by a first operating parameter adjustment based on the rate of change of the first operating parameter, wherein a relationship between an input magnitude of the first discrete input actuation of the control device and the first operating parameter adjustment is non-linear; and
interface circuitry configured to transmit the first operating parameter adjustment to a component of the welding system.

10. The system of claim 9, comprising a welding power supply, wherein the component of the welding system comprises the welding power supply.

11. The system of claim 9, wherein the interface circuitry is configured to transmit the first operating parameter adjustment to the component of the welding system via a wireless connection or a wired connection.

* * * * *